United States Patent
Selvarajan et al.

(10) Patent No.: US 10,252,817 B1
(45) Date of Patent: Apr. 9, 2019

(54) SYSTEM AND METHOD FOR CONSOLIDATING, RATIFYING AND ESCALATION OF UNCERTIFIED APPLICATIONS NOTIFICATIONS

(71) Applicant: Honeywell International Inc., Morris Plains, NJ (US)

(72) Inventors: Ravikumar Selvarajan, Bangalore (IN); Vijay Kumar Shrimal, Bangalore (IN); Ankit Jain, Bangalore (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/799,570

(22) Filed: Oct. 31, 2017

(51) Int. Cl.
    *G01C 21/00* (2006.01)
    *B64D 45/00* (2006.01)

(52) U.S. Cl.
    CPC ...... *B64D 45/00* (2013.01); *B64D 2045/0075* (2013.01)

(58) Field of Classification Search
    CPC ............ B64D 45/00; B64D 2045/0075
    USPC .................................. 304/971; 340/971
    See application file for complete search history.

(56) References Cited

U.S. PATENT DOCUMENTS

| | | | |
|---|---|---|---|
| 6,043,757 A * | 3/2000 | Patrick | G08G 5/0021 340/963 |
| 7,127,683 B2 | 10/2006 | Royalty | |
| 8,190,449 B2 * | 5/2012 | Grady | G06Q 10/087 705/2 |
| 8,935,306 B2 * | 1/2015 | Corbefin | G06F 9/44584 707/823 |
| 9,189,655 B2 * | 11/2015 | Uczekaj | H04L 67/12 |
| 9,972,143 B1 * | 5/2018 | Garai | G07C 5/0808 |
| 2005/0160259 A1 * | 7/2005 | Ogura | H04L 9/00 713/156 |

(Continued)

OTHER PUBLICATIONS

Aspen Avionics, Aspen Avionics Announces Connected Panel, Jul. 26, 2011, pp. 1-5, https://www.aspenavionics.com/news/aspen_avionics_announces_connected_panel.

(Continued)

*Primary Examiner* — Kerri L McNally
*Assistant Examiner* — Thang D Tran
(74) *Attorney, Agent, or Firm* — Bookoff McAndrews, PLLC

(57) ABSTRACT

A method and system for alert notifications is disclosed. The method comprises collecting, in an alert management unit onboard a platform, one or more alerts from one or more applications in operative communication with the alert management unit; determining a platform state and operator workload based on data from one or more onboard sensors and one or more platform electronics systems; ratifying the collected alerts based on predefined criteria, configured criteria from a configuration file, or a priority of the collected alerts; and determining whether a ratified alert is to be notified to an operator. The determining of whether a ratified alert is to be notified is performed by a process comprising determining a format and content of an alert notification for the ratified alert; selecting a notification device to perform the alert notification; and sending a communication to the selected notification device to perform the alert notification.

20 Claims, 6 Drawing Sheets

(56) References Cited

U.S. PATENT DOCUMENTS

| | | | | |
|---|---|---|---|---|
| 2007/0124395 A1* | 5/2007 | Edge | ............... | H04H 20/59 |
| | | | | 709/206 |
| 2012/0274484 A1* | 11/2012 | Zimmer | ............... | G08G 5/0091 |
| | | | | 340/945 |
| 2013/0173798 A1* | 7/2013 | Micucci | ............... | H04L 67/1044 |
| | | | | 709/225 |
| 2015/0074424 A1* | 3/2015 | Uczekaj | ............... | H04L 67/12 |
| | | | | 713/189 |
| 2016/0016671 A1* | 1/2016 | Fournier | ............... | G01C 23/00 |
| | | | | 340/963 |
| 2016/0019732 A1* | 1/2016 | Fournier | ............... | B64D 45/00 |
| | | | | 701/34.2 |
| 2016/0035227 A1* | 2/2016 | Kumar | ............... | G01C 23/00 |
| | | | | 340/971 |
| 2016/0083107 A1* | 3/2016 | Vautier | ............... | G08G 5/0021 |
| | | | | 340/963 |
| 2016/0211931 A1* | 7/2016 | Takahashi | ............... | H04H 20/59 |
| 2018/0044034 A1* | 2/2018 | Newman | ............... | B64D 45/00 |

OTHER PUBLICATIONS

Lind et al., The Effect of Knowledge-Based System Assistance on Piloting Performance, Workload, and Satisfaction, 1990, pp. 775-781, IEEE.

\* cited by examiner

SYSTEM AND METHOD FOR CONSOLIDATING, RATIFYING AND ESCALATION OF UNCERTIFIED APPLICATIONS NOTIFICATIONS

BACKGROUND

Due to the connected aircraft phenomenon, the way avionics and electronic flight bag (EFB) applications work are rapidly and drastically changing. Original equipment manufacturers (OEMs) and avionics manufacturers are moving a lot of non-critical features/applications from the avionics bay to the EFB in the form of uncertified applications (e.g., non-critical controller pilot data link communications (CPDLC) messages reception, 4-D trajectory/takeoff and performance calculations, vertical situational displays applications in some legacy aircrafts, etc.). These intelligent and interconnected EFB applications are inexpensive and help bring sophisticated features into the cockpit in a matter of months, compared to the long cycle time of expensive certified software. Such EFB applications target various domains of operations, such as aircraft maintenance, optimized flight planning/upload/rerouting, approach preview applications, fuel analytics applications, pilot aid solutions in improving the flight's safety and performance margins (e.g., fuel imbalance monitors, standard operating procedure (SOP) monitors, weather monitoring applications, notice to airmen (NOTAM) and other situational awareness related applications, etc.).

The number of uncertified applications being developed is rapidly growing and in the near future, both certified and uncertified applications will work seamlessly together. Due to several benefits that the uncertified applications offer (like inexpensive development cost, quick to develop and deploy, more sophisticated features, greater resources like MIPS/memory/processing speed etc.,) and also due to increasing robust connectivity between certified applications and uncertified applications, a lot of non-safety critical functionalities are increasingly developed as uncertified applications rather than getting developed as certified applications.

Uncertified applications can generate a variety of alert messages. Some of these alert messages can be crucial to safety, such as weather or NOTAM messages, or airline operations center (AOC) uplinks of flight plans, some alert messages are important for maintenance/performance operations or passenger comfort (e.g., SOP monitor based alerts), and some alert messages are for lesser important communications (e.g., airliner CPDLC messages on operations). While some of the messages can wait, other messages deserve immediate attention depending on the flight phase and pilot workload.

During flight, the pilot has many tasks to perform and a good number of controls and displays to keep in view. This includes the windshield (to look out for clouds, traffic, terrain, airport, etc.), the primary flight display (PFD) (to monitor critical flight parameters), the multi-function display (MFD) (showing a moving map, navigation information, weather data, route plan, sensor/device status), and aural/visual/physical alerts from various systems. The EFB device is generally placed in a location of the cockpit that does not get pilot attention readily, and hence, alerts can be easily missed by a pilot who is watching the cockpit displays or the windshield. Also, some of these alerts may be hidden behind other windows of different applications. Further, alerts cannot be ported to the cockpit displays, since the alerts are non-standard messages and include many varieties, and thus cannot be allowed to clutter the view of the pilot. Moreover, even though some of these alerts might be important, they cannot distract the pilot in some crucial junctures like emergencies/takeoffs/landings.

Accordingly, there is a need to have an intelligent method of informing a pilot about the alerts from uncertified applications based on the context of flight and the pilot workload, but without distracting the pilot from handling safety critical activities.

SUMMARY

A method and system for alert notifications is disclosed. The method comprises collecting, in an alert management unit onboard a platform, one or more alerts from one or more applications in operative communication with the alert management unit; determining, in the alert management unit, a platform state and operator workload based on data from one or more onboard sensors and one or more platform electronics systems; ratifying, in the alert management unit, the collected alerts based on predefined criteria, configured criteria from a configuration file, or a priority of the collected alerts; and determining, in the alert management unit, whether a ratified alert is to be notified to an operator. The determining of whether a ratified alert is to be notified is performed by a process that comprises determining a format and content of an alert notification for the ratified alert; selecting a notification device to perform the alert notification for the ratified alert; and sending a communication to the selected notification device to perform the alert notification.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
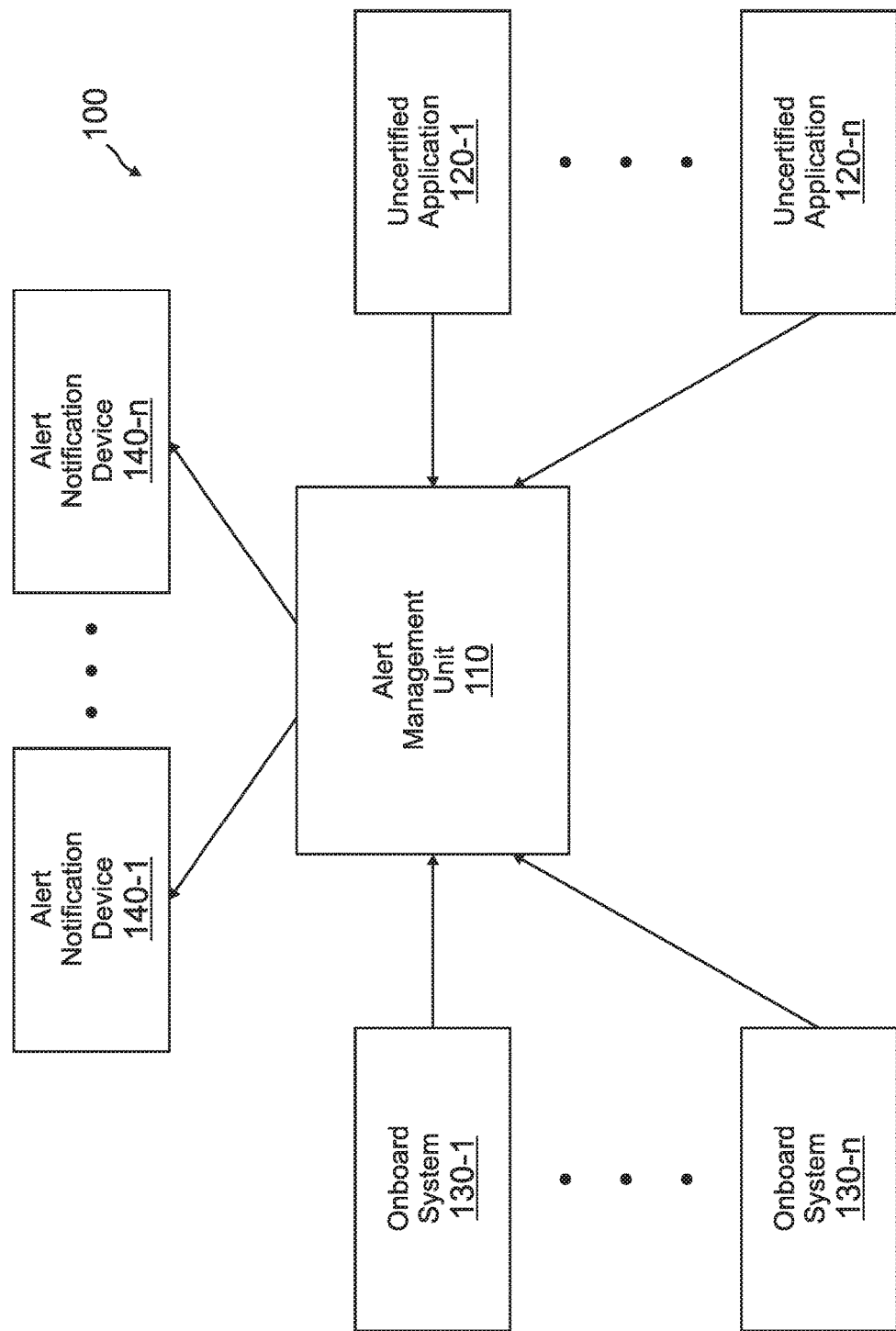
FIG. 1 is a block diagram of a system for alert notifications, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method are disclosed for consolidating, ratifying, and escalation of alert notifications from various applications. For example, the system and method enable an operator of a platform such as a vehicle to be informed of alerts from uncertified applications in an appropriate time and manner, so there is no safety risk, while still allowing the operator to take notice of the alerts. The system provides a mechanism by which the operator can be notified of the events captured by uncertified applications based on the various conditions, criticality levels of the alerts, and the like, such as in a display area/font/color or other alerting mechanism that is appropriate for the context.

As used herein, the term "platform" can refer to any of a variety of mobile vehicles or stationary structures, where alert notifications are sent to an operator. In addition, the terms "certified" and "uncertified" refer to whatever the related regulatory authority deems certified or uncertified based on the relevant industry. For example, aircraft can use applications that meet Federal Aviation Administration (FAA) or European Aviation Safety Agency (EASA) certification standards; ground vehicles or passenger ships can use applications that meet certification standards from appropriate regulatory agencies.

When employed in an aviation setting, the present system generally performs the following functions: connects with certified devices and understands the current flight phase/pilot workload; connects with all of the uncertified applications and receives all the alerts from these applications; and ratifies the alerts from multiple applications by analyzing and prioritizing the applications. The following decisions are then made by the system: whether or not to inform the pilot; when to inform the pilot; what to inform the pilot; where to inform the pilot and how to inform the pilot.

The present method can be implemented in either an uncertified application such as an electronic flight bag (EFB) application, or in a certified application such as a certified avionics application, which will interface with all the other EFB, ground based, and cloud based applications that serve the cockpit. The method monitors alerts generated by a configured list of uncertified applications, provides for ratification and selection of one or more alerts, and decides which alert needs to be escalated based on the severity/criticality of the alert, the current aircraft state, and the pilot workload. This ratification/selection can be based on a loadable configuration file. The decision of whether or not to escalate the alert to the pilot is based on the current aircraft state and the pilot workload. When it is decided not to escalate immediately, the method decides either to postpone the escalation until a set of pre-determined conditions are satisfied (again, configuration driven) or to discard the alert altogether. If there are multiple alerts, a collective ratification can performed based on a predetermined configuration, resulting in selecting the most important alert to notify. Then, the method determines if the current flight phase and the pilot work load permits the alerts to be notified, and based on these conditions, will determine where or how to provide the alert notification. Alternatively, multiple alerts can be selected to be escalated simultaneously.

The alert can be suppressed if the pilot work load is heavy, if the flight phase is critical, or if some emergency situation has been declared. In this situation, the alerts can be buffered then produced later when conditions become conducive. The alerts can also be downlinked to air traffic control (ATC) or airline operations centers. The alert can be removed after timing out, after the pilot acknowledges the alert, or if the issue that caused the alert to be raised has ceased to exist. For example, the alert notification can be displayed until the pilot acknowledges the alert, or the alert notification can be removed after displaying for a fixed period of time.

The alert notification devices chosen can vary depending on a pre-determined set of conditions or can be configuration driven. Examples of suitable alert notification devices include an electronic flight instrument system (EFIS) display, a primary flight display (PFD), a multi-function display (MFD), a control display unit (CDU), a multi-function control and display unit (MCDU), a head-up display (HUD), a wearable display, an aural alert device, and the like. The form or format chosen for the alerting notification can vary depending on the pre-determine set of conditions or be configuration driven.

The same alert can be displayed in various locations, in various display devices, or in various formats, again depending on conditions. For example, the alert can be shown as a small symbol in a PFD or MFD, the alert can be issued as a mild aural tone, the alert can be issued in a scratch pad message in an MCDU, or the alert can be shown on more than one display device. In another example, when a pilot is viewing a HUD, if the alert is important, and the flight is in cruise mode, the alert can be shown in the right most top corner of the HUD, such as a bright red dot. In another implementation, a human eye tracking mechanism can be employed to identify the location where the pilot is looking, and then display the alert notification message at that location.

Further details of the present systems and methods are described hereafter with reference to the drawings.

FIG. 1 is a block diagram of a system 100 for uncertified applications alert notifications in a platform such as a vehicle. The system 100 generally includes an alert management unit 110, which is operative to receive alerts from one or more applications such as uncertified applications 120-1 . . . 120-*n*, which may be hosted by mobile devices, other vehicles, ground centers or servers, the Internet, the cloud, or the like. The alert management unit 110 is also operative to receive data from one or more onboard systems 130-1 . . . 130-*n*, such as vehicle sensors and vehicle electronics. The alert management unit 110 also operatively communicates with one or more onboard alert notification devices 140-1 . . . 140-*n*, such as one or more visual displays, an aural alert device, a vibrational alert device, or the like.

During operation, alerts from the uncertified applications 120-1 . . . 120-*n* are collected by alert management unit 110, which ratifies and prioritizes the alerts for notification. The data from the onboard systems 130-1 . . . 130-*n* is used by alert management unit 110 to determine situational data related to the platform (vehicle) state and operator workload. The alerts are then sent to the alert notification devices 140-1 . . . 140-*n* based on various conditions.

Figure 2:
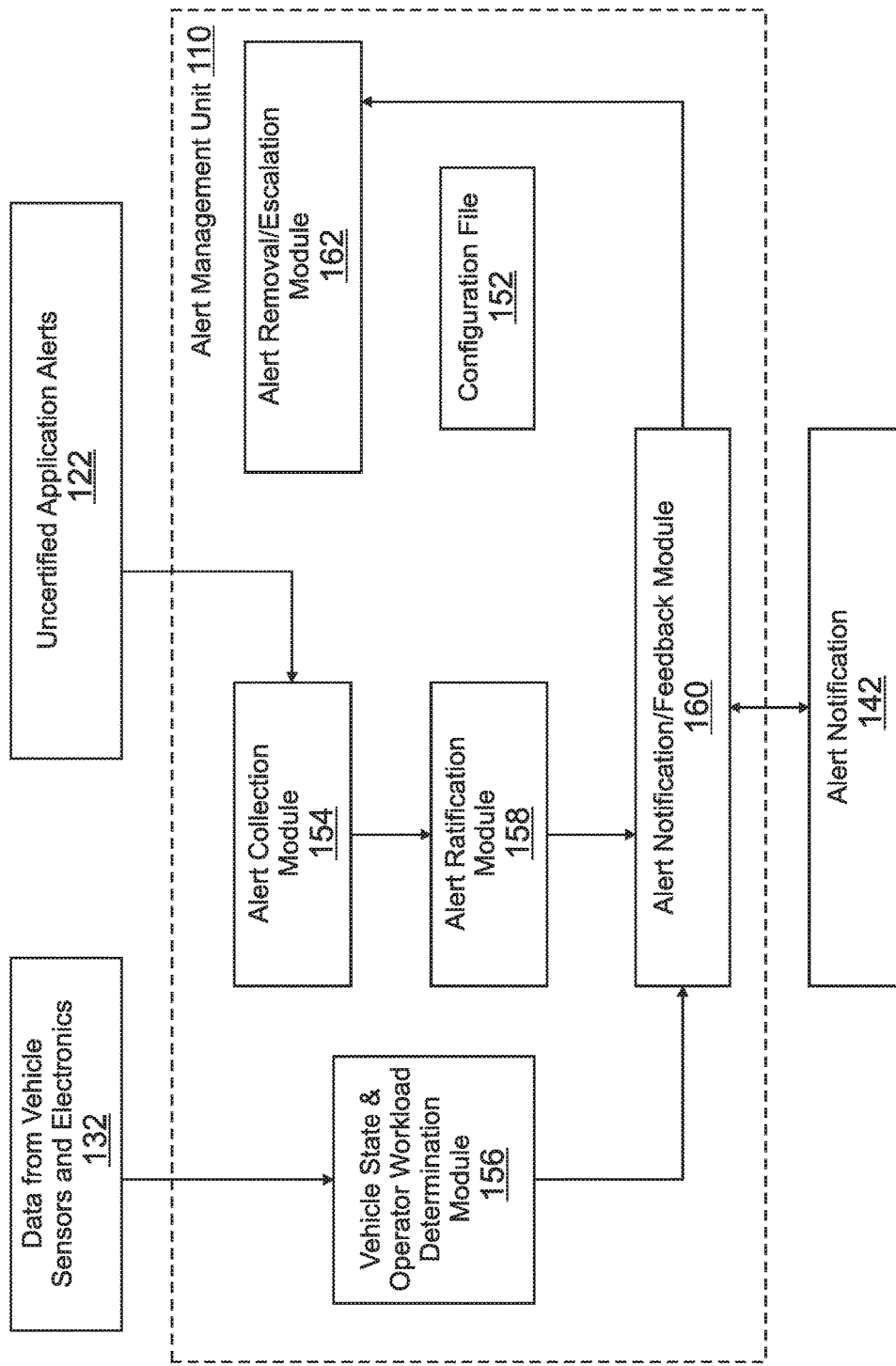
FIG. 2 is a block diagram showing further details of an alert management unit implemented in the system of FIG. 1.

FIG. 2 is a block diagram depicting further details of implementing alert management unit 110 such as for a vehicle. As shown, alert management unit 110 generally comprises a loadable configuration file 152, which provides various conditions for processing the alerts. An alert collection module 154 is operative to receive and collect uncertified application alerts (block 122), such as generated by uncertified applications 120-1 . . . 120-*n* (FIG. 1). A vehicle state and operator workload determination module 156 is operative to receive data from vehicle sensors and electronics (block 132), such as from onboard systems 130-1 . . . 130-*n* (FIG. 1), and to generate current vehicle situational data. An alert ratification module 158 is operative to ratify the alerts from the alert collection module 154, based on the priority of the alerts. For example, the alert ratification module 158 can ratify the alerts into predetermined priority categories based on predefined criteria or configured criteria from configuration file 152, or can ratify the alerts based on the situational data.

An alert notification/feedback module 160 is operative to receive the ratified alerts from the alert ratification module 158, and the situational data from the vehicle state and operator workload determination module 156. The alert notification/feedback module 160 determines the format and content of a ratified alert based on information from configuration file 152, selects a device for the ratified alert notification, and sends a communication to the selected device, such as alert notification devices 140-1 . . . 140-n (FIG. 1), to perform the alert notification (block 142).

An alert removal/escalation module 162 is in operative communication with the alert notification/feedback module 160. The alert removal/escalation module 162 interfaces with an alert generating uncertified application to clear the alert notification when a respective alert is acknowledged by the vehicle operator. Otherwise, the alert removal/escalation module 162 can take further action based on a preconfigured condition when the respective alert is unacknowledged, such as escalating the alert to a ground system or via other alerting systems.

Figure 3:
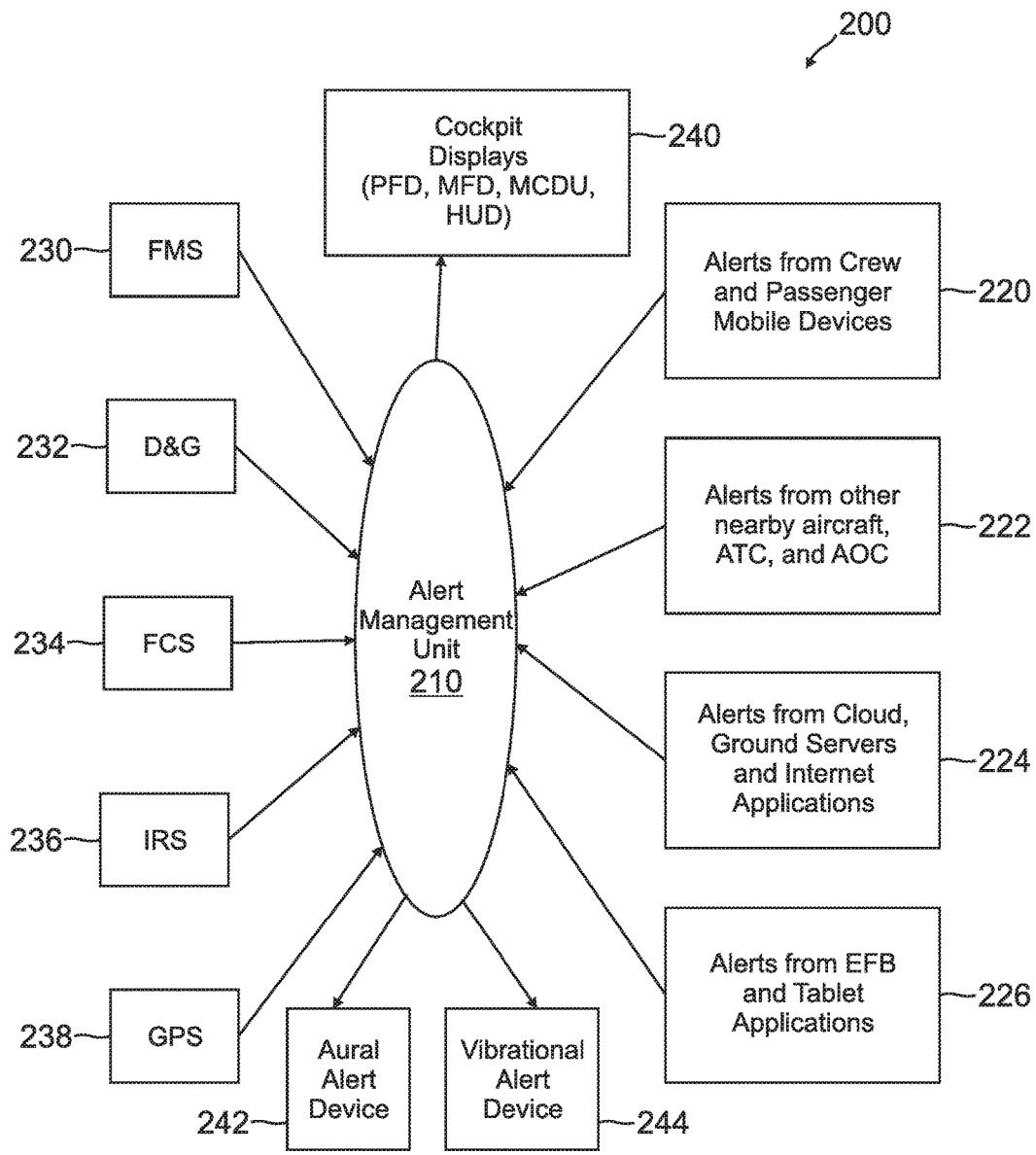
FIG. 3 is a block diagram of a system for uncertified applications alert notifications, implemented in an aviation environment according to another embodiment.

FIG. 3 is a block diagram of a system 200 for uncertified applications alert notifications, which can be implemented in an aviation environment according to another embodiment. The system 200 generally includes an alert management unit 210, which is operative to receive alerts from various uncertified applications, and data related to the current state of an aircraft and pilot workload from onboard avionics systems. The alert management unit 210 can be implemented either as a certified application, such as on a flight deck of the aircraft, or as an uncertified application on an electronic flight bag (EFB) device.

The uncertified applications that generate various alerts can be hosted by various data sources. For example, the alerts can be from crew and passenger mobile devices (block 220); the alerts can be from other nearby aircraft, air traffic control (ATC), or an airline operations center (AOC) (block 222); the alerts can be from the cloud, ground servers, and Internet applications (block 224); or the alerts can be from an EFB and other tablet applications (block 226). The data related to the current state of the aircraft and pilot workload can be provided by one or more onboard avionics systems and sensors. For example, the data can be from a flight management system (FMS) 230, a graphical display system (D&G) 232, a flight control system (FCS) 234, an inertial reference system (IRS) 236, or a global positioning system (GPS) receiver 238.

The alert management unit 210 also operatively communicates with one or more onboard alert notification devices, such as one or more cockpit displays 240, an aural alert device 242, or a vibrational alert device 244. Examples of suitable cockpit displays 240 include a PFD, an MFD, an MCDU, or a HUD. The aural alert device 242 can be implemented with an audio speaker system, for example. The vibrational alert device 244 can be implemented as a cockpit stick shaker, for example.

Figure 4:
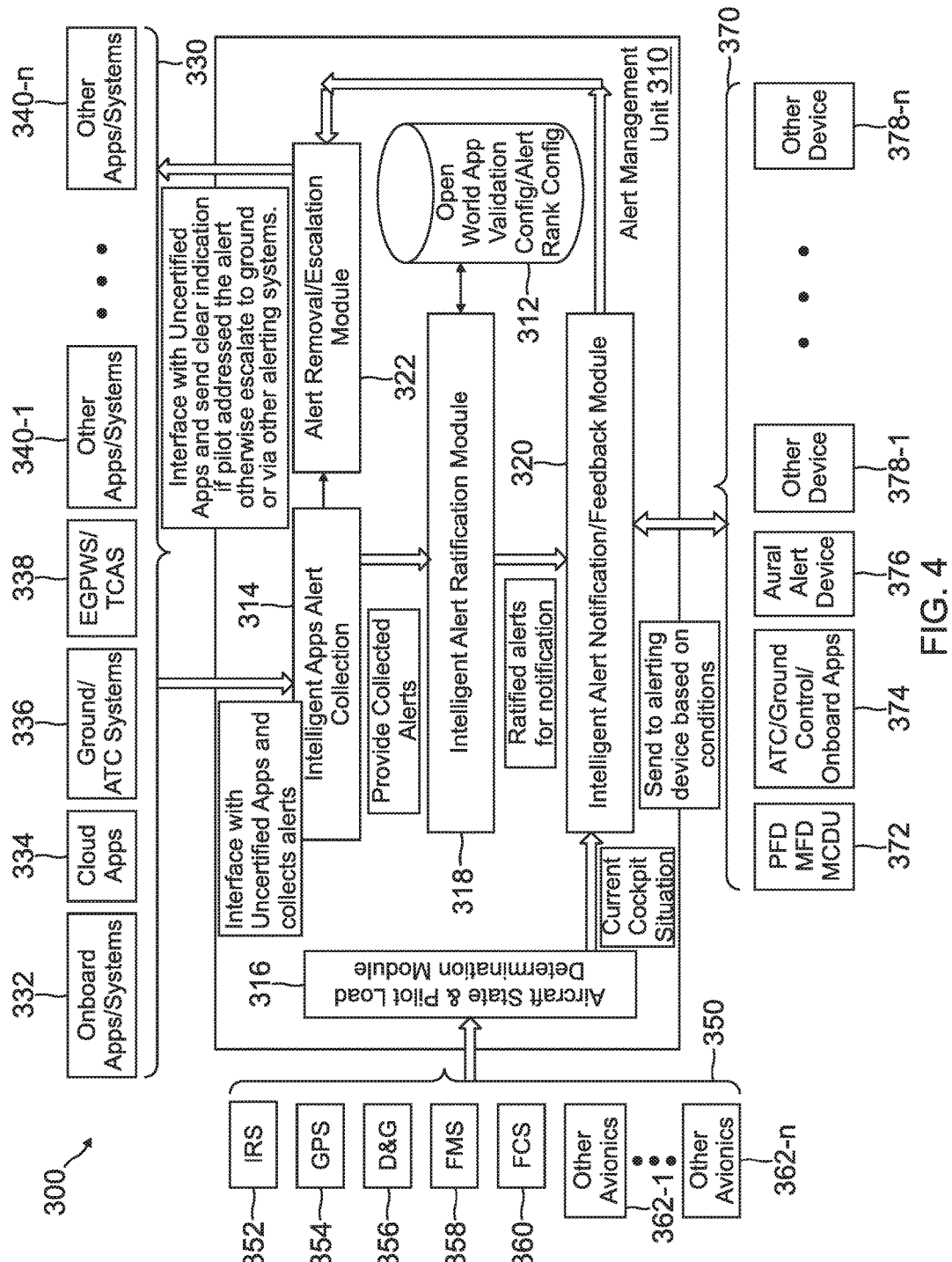
FIG. 4 is a block diagram of an exemplary architecture of a system for uncertified applications alert notifications, implemented in an aviation environment.

FIG. 4 illustrates an exemplary architecture of a system 300 for uncertified applications alert notifications, which can be implemented in an aviation environment. The system 300 generally includes an alert management unit 310, which is operative to receive alerts from various uncertified applications/systems 330, and to receive data related to the current state of an aircraft and pilot workload from various onboard avionics systems 350. The alert management unit 310 also operatively communicates with various alert notification devices 370.

The uncertified applications/systems 330 can include, for example, onboard applications (apps)/systems 332 such as hosted on mobile devices; cloud apps 334; ground/ATC systems 336; an enhanced ground proximity warning system, or traffic alert and collision avoidance system (EGPW/TCAS) 338; and one or more other apps/systems 340-1 . . . 340-n. The onboard avionics systems 350 can include, for example, an IRS 352, a GPS receiver 354, a D&G 356, an FMS 358, an FCS 360, and one or more other avionics systems 362-1 . . . 362-n. The alert notification devices 370 can include, for example, cockpit displays 372 such as a PFD, MFD, or MCDU; other display types 374 such as displays for ATC, ground control, or onboard apps; an aural alert device 376; and one or more other notification devices 378-1 . . . 378-n.

As shown in FIG. 4, alert management unit 310 includes a loadable configuration file 312, which provides various configurations for processing the alerts, such as open world application (app) validation configuration, an alert rank configuration, and the like. An intelligent applications alert collection module 314 interfaces with and collects alerts from uncertified applications/systems 330. For example, module 314 can be interfaced with various open world applications, either onboard or in the cloud. The module 314 collects the various alerts generated by the open world applications, and filters out the alerts based on whether the open world application is configured to send alerts to certified avionics or not, and the alert generated is not a duplicate. If alert is a duplicate, then selection logic is applied to select the most reliable alert based on the configuration of the aircraft and the type of application that provides the alert.

An aircraft state and pilot load determination module 316 is operative to receive the data from onboard avionics systems 350, and to generate current cockpit situation data by determining the current aircraft state and pilot workload based on the collected sensor/system data. For example, the aircraft state can include cruise/landing/takeoff or if there is an emergency situation in the cockpit, based on the data collected from the sensors or intelligent avionics systems, or any alert from EGPWS/TCAS 338.

An intelligent alert ratification module 318 is operative to ratify the collected alerts provided by alert collection module 314. For example, the alert ratification module 318 can ratify the alerts into predetermined priority categories based on predefined criteria or configured criteria from configuration file 312, or can ratify the alerts based on the cockpit situation data. For example, module 318 has logic to ratify the alerts into predetermined categories such as: critical, important, normal, or trivial.

An intelligent alert notification/feedback module 320 is operative to receive the ratified alerts for notification from the alert ratification module 318, and the cockpit situation data from the aircraft state and pilot load determination module 316. The alert notification/feedback module 320 interfaces with the various alert notification devices 370, or any other alerting device such as a central alert notification management system. The module 320 determines the format and content of the ratified alerts based on information from configuration file 312, selects at least one notification device 370 for the ratified alert notification, and sends a communication to the selected alert notification device 370 to perform the alert notification.

In one implementation, alert notification/feedback module 320 has logic to decide when to notify the alert or to discard the alert. In case the decision is made not to escalate the alert immediately, module 320 can decide either to postpone the escalation until a set of pre-determined conditions are satisfied (configuration driven) or to discard the alert altogether. If the alert is to be notified, the form/format chosen for alerting can vary depending on the pre-determined conditions. Examples of possible alert forms include aural tones, physical vibrations, dots/small forms of different colors and sizes—each representing the severity/source application, scratch pad messages, a combination of one or more of these forms, or the like. The module 320 intelligently determines which notification device to select based on the form/content of the alert, and notifies the selected device either directly or via a central alert notification system.

The alert notification/feedback module 320 can also determine whether the pilot has acknowledged the alert, and send the pilot acknowledgement result to an alert removal/escalation module 322, which also interfaces with uncertified applications/systems 330. The module 322 sends a clear indication if the pilot has addressed the alert, and otherwise, can take further action to escalate the alert to a ground system or via other alerting systems. For example, if the alert is acknowledged by the pilot, module 322 will send a notification to the alert generating open world application to clear the alert notification. If the alert is not acknowledged by the pilot, then module 322 takes action based on a pre-configured condition like alerting a ground station.

Figure 5A:
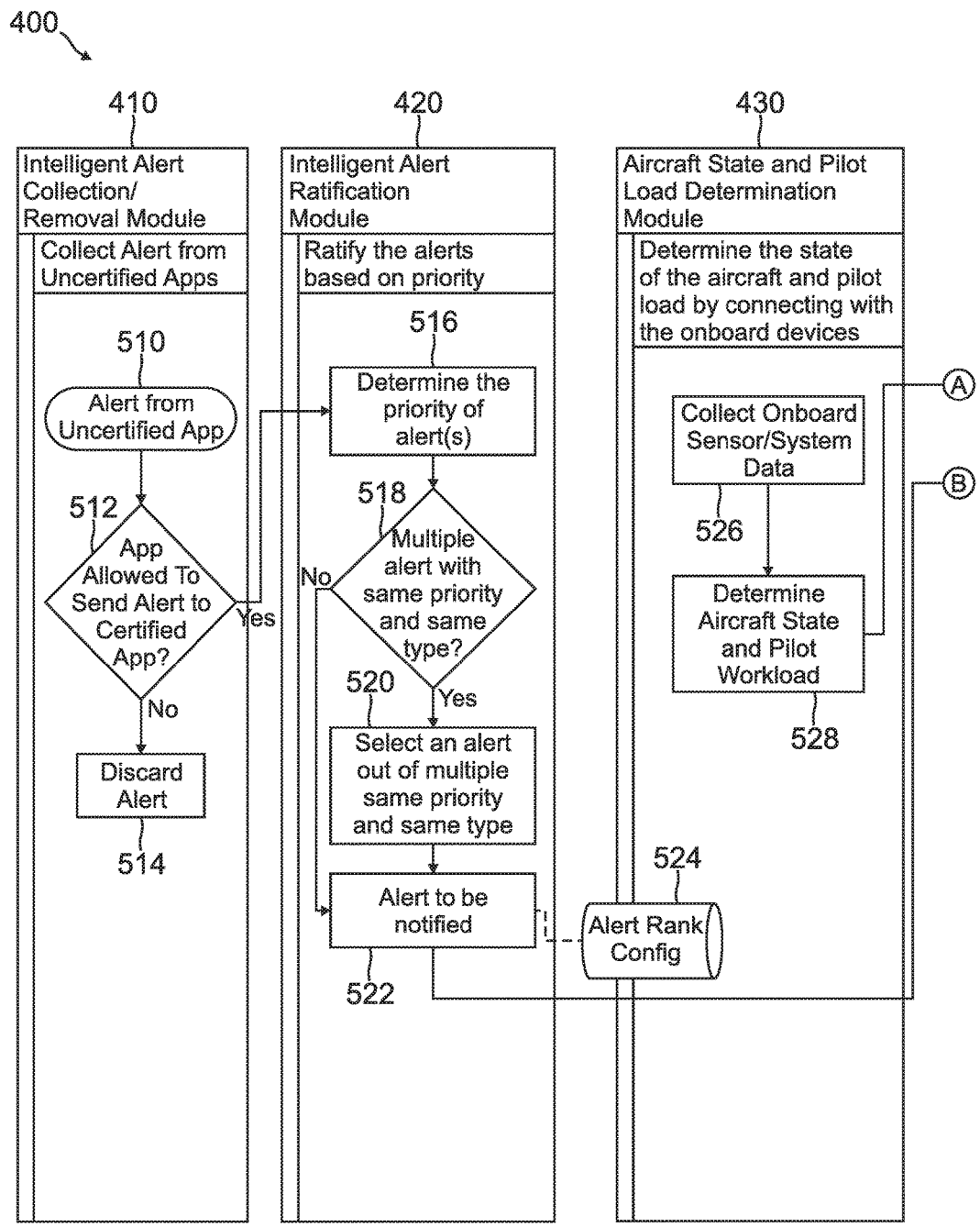
FIGS. 5A and 5B depict an algorithm flowchart for an exemplary operational method carried out by various functional modules in a system for uncertified applications alert notifications.
Figure 5B:
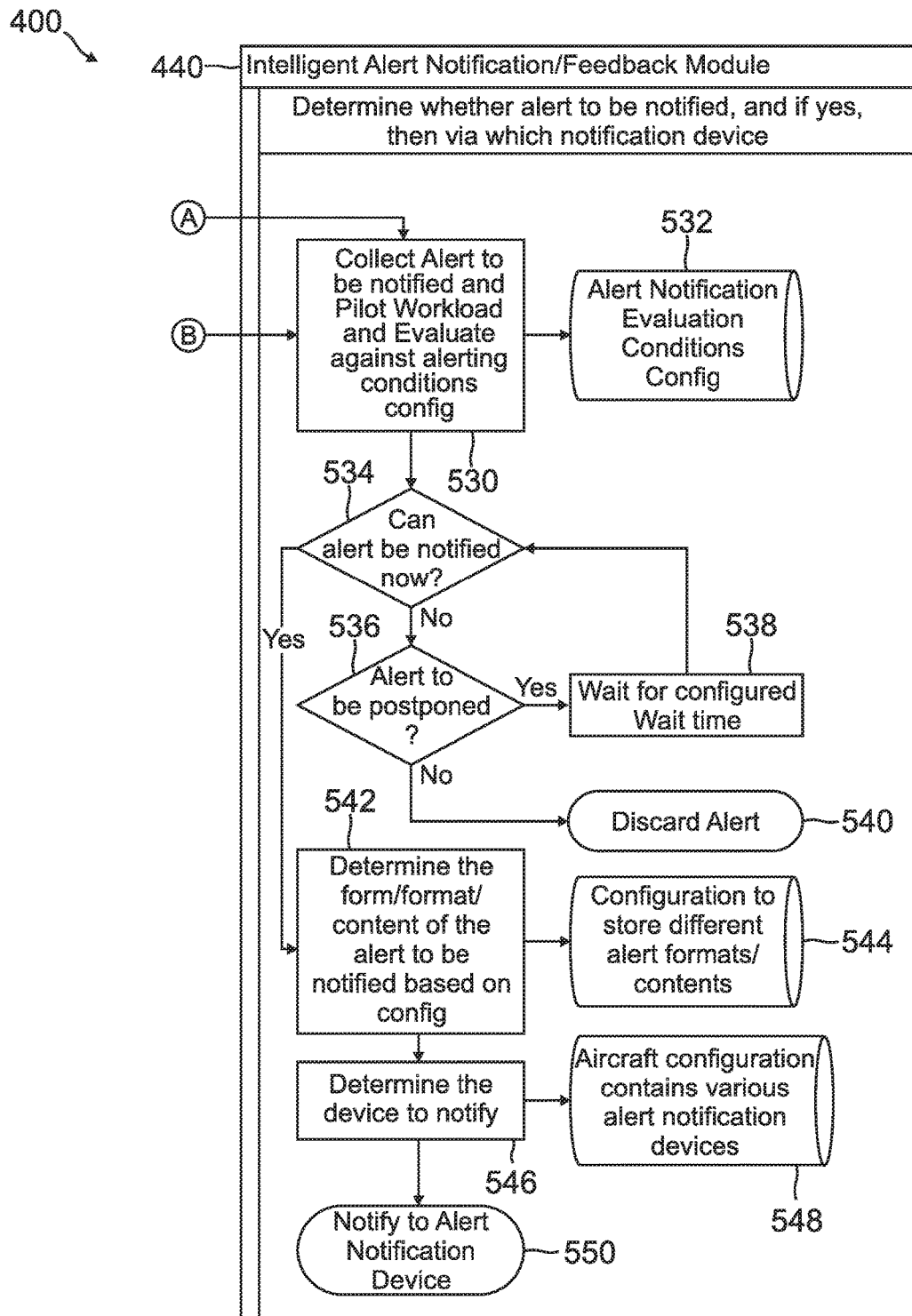

FIGS. 5A and 5B depict an algorithm flowchart showing an exemplary operational method carried out by various functional modules in a system 400 for uncertified applications alert notifications. The functional modules include an intelligent alert collection/removal module 410, which collects alerts from uncertified applications; an intelligent alert ratification module 420, which ratifies the alerts based on priority of the alerts; an aircraft state and pilot load determination module 430, which determines the state of the aircraft and pilot workload by connecting with the onboard devices; and an intelligent alert notification/feedback module 440, which determines whether the alert is to be notified, and if so, then via which notification device.

As shown in FIG. 5A, during the operational method alert collection/removal module 410 collects the alert(s) from an uncertified application(s) (block 510), and determines whether the uncertified application(s) is allowed to send the alert(s) to a certified application (block 512). If not, the alert(s) is discarded (block 514). If allowed, the alert(s) are then passed to alert ratification module 420, which determines the priority of the alert(s) (block 516). A determination is then made whether there are multiple alerts with the same priority and the same type (block 518). If yes, an alert is selected out of the multiple alerts with the same priority and the same type (block 520), and the selected alert is configured to be notified (block 522), such as with an alert rank configuration file (block 524). For example, if there is more than one alert of the same priority and the same type, the collective ratification, based on a predetermined configuration, is performed resulting in selecting the most important alert to notify. If the determination is made that there are not multiple alerts with the same priority and the same type (block 518), then the alert is directly configured to be notified (block 522). The alert to be notified is then sent to the alert notification/feedback module 440 (FIG. 5B).

Also during the operational method, the aircraft state and pilot load determination module 430 collects onboard sensor/system data (block 526) by connecting to various sensors of the aircraft along with the some of the intelligent systems such as FMS/FCS/Displays, EGPWS/TCAS, or the like. The module 430 then determines the current aircraft state and pilot workload based on the collected sensor/system data (block 528), and sends the pilot workload information to the alert notification/feedback module 440 (FIG. 5B).

As depicted in FIG. 5B, the alert notification/feedback module 440 collects the alert to be notified along with the pilot workload information, and evaluates against an alerting conditions configuration (block 530), by using an alert notification evaluation conditions configuration file (block 532). The module 440 then determines whether the alert can be notified now (block 534). If not, module 440 determines whether the alert is to be postponed (block 536). If the alert is to be postponed, the alert is buffered for a configured wait time (block 538), after which module 440 again determines whether the alert can be notified now (block 534). If the alert is not to be postponed, the alert is discarded (block 540). If the alert can be notified now, module 440 determines the form/format/content of the alert to be notified based on a configuration (block 542), by using a configuration file that stores different alert formats/contents (block 544). The module 440 then determines the device to be used to notify the alert (block 546), using an aircraft configuration file that contains various alert notification devices (block 548). The module 440 then notifies the selected alert notification device (block 550) to perform the alert notification.

A processor used in the present system can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. Various process tasks can include controlling spatial scanning and orientation, laser operation, photodetector control and operation, and awareness of system orientation and state. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a method for alert notifications, the method comprising: collecting, in an alert management unit onboard a platform, one or more alerts from one or more applications in operative communication with the alert management unit; determining, in the alert management unit, a platform state and operator workload based on data from one or more onboard sensors and one or more platform electronics systems; ratifying, in the alert management unit, the collected alerts based on predefined criteria, configured criteria from a configuration file, or a priority of the collected alerts; and determining, in the alert management unit, whether a ratified alert is to be notified to an operator by a process comprising: determining a format and content of an alert notification for the ratified alert; selecting a notification device to perform the alert notification for the ratified alert; and sending a communication to the selected notification device to perform the alert notification.

Example 2 includes the method of Example 1, wherein the one or more alerts are from one or more uncertified applications, and the platform comprises a vehicle, the method further comprising: sending a notification to an alert generating uncertified application to clear the alert notification when a respective alert is acknowledged by the operator of the vehicle; or taking further action based on a preconfigured condition when the respective alert is unacknowledged by the operator of the vehicle.

Example 3 includes the method of Example 2, wherein the vehicle comprises an aircraft, and the one or more platform electronics systems comprise one or more avionics systems.

Example 4 includes the method of any of Examples 1-3, wherein during the collecting of the one or more alerts, the method further comprising: determining whether an alert received from an uncertified application is allowed to be sent to a certified application; discarding the received alert if not allowed to be sent to the certified application.

Example 5 includes the method of any of Examples 1-4, wherein during the ratifying of the collected alerts, the method further comprising: determining a priority of the received alert; determining whether there are multiple received alerts with a same priority and same type; if there are multiple received alerts with the same priority and same type, selecting an alert to be notified out of the multiple received alerts and configuring the selected alert to be notified; if there are not multiple received alerts with the same priority and same type, configuring the received alert to be notified.

Example 6 includes the method of any of Examples 1-5, wherein during the determining of whether the ratified alert is to be notified, the method further comprising: (a) determining whether the ratified alert is to be notified immediately; (b) if the ratified alert is not to be notified immediately, determining whether the ratified alert is to be postponed; if the ratified alert is to be postponed, buffering the ratified alert for a configured wait time and returning to step (a); if the ratified alert is not to be postponed, discarding the ratified alert; (c) if the ratified alert is to be notified immediately, determining the format and content of the alert notification for the ratified alert; (d) selecting the notification device to perform the alert notification for the ratified alert; and (e) sending a communication to the selected notification device to perform the alert notification using a selected notification mechanism.

Example 7 includes the method of any of Examples 1-6, wherein the alert management unit is hosted as an avionics certified application onboard an aircraft.

Example 8 includes the method of any of Examples 1-6, wherein the alert management unit is hosted as an uncertified application on an electronic flight bag (EFB) device.

Example 9 includes the method of any of Examples 1-8, wherein the selected notification device comprises an electronic flight instrument system (EFIS) display, a primary flight display (PFD), a multi-function display (MFD), a control display unit (CDU), a multi-function control and display unit (MCDU), a head-up display (HUD), a wearable display, an aural alert device, or a vibrational alert device.

Example 10 includes the method of any of Examples 1-9, wherein the alert notification comprises symbols having one or more colors or sizes, scratch pad messages, one or more aural tones, one or more physical vibrations, or combinations thereof.

Example 11 includes a system for alert notifications, the system comprising a processor; and an alert management unit in operative communication with the processor. The alert management unit comprises: an alert collection module operative to collect alerts generated by one or more applications; a platform state and operator workload determination module, which is in operative communication with one or more onboard sensors, and one or more platform electronics systems; an alert ratification module operative to receive the collected alerts from the alert collection module, wherein the alert ratification module is operative to ratify the collected alerts into predetermined priority categories based on predefined criteria or configured criteria from a configuration file; and an alert notification and feedback module operative to receive ratified alerts from the alert ratification module, and situational data from the platform state and operator workload determination module. The alert notification and feedback module is operative to determine a format and content of an alert notification for a ratified alert; select a notification device to perform the alert notification for the ratified alert; and send a communication to the selected notification device to perform the alert notification.

Example 12 includes the system of Example 11, wherein the processor is located onboard a vehicle or in a ground center, and the collected alerts are generated by one or more uncertified applications.

Example 13 includes the system of Example 12, wherein the alert management unit further comprises an alert removal/escalation module in operative communication with the uncertified applications, and the alert notification and feedback module. The alert removal/escalation module is configured to send a notification to an alert generating uncertified application to clear the alert notification when a respective alert is acknowledged by a vehicle operator; or take further action based on a preconfigured condition when the respective alert is unacknowledged by the vehicle operator.

Example 14 includes the system of any of Examples 12-13, wherein the vehicle comprises an aircraft, and the one or more platform electronics systems comprise one or more avionics systems.

Example 15 includes the system of any of Examples 11-14, wherein the alert collection module is further operative to determine whether an alert received from an uncertified application is allowed to be sent to a certified application; discard the received alert if not allowed to be sent to the certified application; send the received alert to the alert ratification module if the received alert is allowed to be sent to the certified application.

Example 16 includes the system of any of Examples 11-15, wherein the alert ratification module is further operative to determine a priority of the alert received from the alert collection module; determine whether there are multiple received alerts with a same priority and same type; if there are multiple received alerts with the same priority and same type, select an alert to be notified out of the multiple received alerts, and configure the selected alert to be notified; if there are not multiple received alerts with the same priority and same type, configure the received alert to be notified; and send the configured alert to the alert notification and feedback module.

Example 17 includes the system of any of Examples 11-16, wherein the platform state and operator workload determination module is operative to collect onboard sensor data and platform electronics systems data; determine a current platform state and operator workload based on the collected sensor data and platform electronics systems data; and send operator workload information to the alert notification and feedback module.

Example 18 includes the system of any of Examples 11-17, wherein the alert notification and feedback module is further operative to: (a) determine whether the ratified alert is to be notified immediately; (b) if the ratified alert is not to be notified immediately, determine whether the ratified alert is to be postponed; if the ratified alert is to be postponed, buffer the ratified alert for a configured wait time and return to step (a); if the ratified alert is not to be postponed, discard the ratified alert; (c) if the ratified alert is to be notified immediately, determine the format and content of the alert notification for the ratified alert based on information from the configuration file; (d) select the notification device to perform the alert notification for the ratified alert; and (e) send a communication to the selected notification device to perform the alert notification using a selected notification mechanism.

Example 19 includes the system of any of Examples 11-18, wherein the alert management unit is hosted as an avionics certified application onboard an aircraft; or the alert management unit is hosted as an uncertified application on an EFB device.

Example 20 includes the system of any of Examples 11-19, wherein the selected notification device comprises an EFIS display, a PFD, a MFD, a CDU, a MCDU, a HUD, a wearable display, an aural alert device, or a vibrational alert device; and the alert notification comprises symbols having one or more colors or sizes, scratch pad messages, one or more aural tones, one or more physical vibrations, or combinations thereof.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for alert notifications by an on-board processor of a platform that is executing software instructions, the method comprising:
    collecting one or more alerts from one or more applications in operative communication with the processor;
    determining a platform state and operator workload based on data from one or more onboard sensors and one or more platform electronics systems;
    ratifying the collected one or more alerts based on predefined criteria, configured criteria from a configuration file, or a priority of the collected one or more alerts;
    determining whether a ratified alert, among the ratified one or more alerts, is to be notified to an operator by performing a first process comprising:
        determining whether the ratified alert is to be notified immediately;
        in response to determining the ratified alert is not to be notified immediately, determining whether the ratified alert is to be postponed; and
        in response to determining the ratified alert is to be postponed, buffering the ratified alert for a configured wait time and returning to determining whether the ratified alert is to be notified immediately; and
    in response to determining the ratified alert is to be notified to the operator, notifying the operator by performing a second process comprising:
        determining a format and content of an alert notification for the ratified alert;
        selecting a notification device to perform the alert notification for the ratified alert; and
        sending a communication to the selected notification device to perform the alert notification.

2. The method of claim 1,
    wherein the collected one or more alerts are from one or more uncertified applications,
    the platform comprises a vehicle, and
    the method further comprises:
        sending a notification to an alert generating uncertified application to clear the alert notification when a respective alert is acknowledged by the operator of the vehicle; or
        taking further action based on a preconfigured condition when the respective alert is unacknowledged by the operator of the vehicle.

3. The method of claim 2,
    wherein the vehicle comprises an aircraft, and
    the one or more platform electronics systems comprise one or more avionics systems.

4. The method of claim 1, wherein during the collecting of the one or more alerts, the method further comprises:
    determining whether an alert received from an uncertified application is allowed to be sent to a certified application;
    in response to determining that the received alert received from the uncertified application is not allowed to be sent to the certified application, discarding the received alert.

5. The method of claim 4, wherein during the ratifying of the collected one or more alerts, the method further comprises:
    determining a priority of the received alert;
    determining whether there are multiple received alerts with a same priority and same type;
    if there are multiple received alerts with the same priority and same type, selecting an alert to be notified out of the multiple received alerts and configuring the selected alert to be notified; and
    if there are not multiple received alerts with the same priority and same type, configuring the received alert to be notified.

6. The method of claim 4, wherein during the determining of whether the ratified alert is to be notified, the method further comprising:
    in response to determining the ratified alert is not to be postponed, discarding the ratified alert;
    in response to determining the ratified alert is to be notified immediately, performing the second process for the ratified alert.

7. The method of claim 1, wherein the processor is apart of a system that hosts as an avionics certified application onboard an aircraft.

8. The method of claim 1, wherein the processor is apart of a system that hosts an uncertified application on an electronic flight bag (EFB) device.

9. The method of claim 1, wherein the selected notification device comprises an electronic flight instrument system (EFIS) display, a primary flight display (PFD), a multi-function display (MFD), a control display unit (CDU), a multi-function control and display unit (MCDU), a head-up display (HUD), a wearable display, an aural alert device, or a vibrational alert device.

10. The method of claim 1, wherein the alert notification comprises symbols having one or more colors or sizes, scratch pad messages, one or more aural tones, one or more physical vibrations, or combinations thereof.

11. A system for alert notifications, the system comprising:
   a memory storing instructions; and
   a processor executing the instructions to:
      collect alerts generated by one or more applications;
      ratify the collected alerts into predetermined priority categories based on predefined criteria or configured criteria from a configuration file; and
      receive situational data from one or more onboard sensors and one or more platform electronics systems;
      determine whether a ratified alert, among the ratified alerts, is to be notified to an operator by performing a first process comprising:
         determining whether the ratified alert is to be notified immediately;
         in response to determining the ratified alert is not to be notified immediately, determining whether the ratified alert is to be postponed; and
         in response to determining the ratified alert is to be postponed, buffering the ratified alert for a configured wait time and returning to determining whether the ratified alert is to be notified immediately; and
      in response to determining the ratified alert is to be notified to the operator, notify the operator by performing a second process comprising
         determining a format and content of an alert notification for a ratified alert;
         selecting a notification device to perform the alert notification for the ratified alert; and
         sending a communication to the selected notification device to perform the alert notification.

12. The system of claim 11, wherein the processor is located onboard a vehicle or in a ground center, and the collected alerts are generated by one or more uncertified applications.

13. The system of claim 12, wherein the processor further executes the instructions to:
   send a notification to an alert generating uncertified application to clear the alert notification when a respective alert is acknowledged by the operator; or
   take further action based on a preconfigured condition when the respective alert is unacknowledged by the operator.

14. The system of claim 12, wherein the vehicle comprises an aircraft, and the one or more platform electronics systems comprise one or more avionics systems.

15. The system of claim 11, wherein the processor further executes the instructions to:
   determine whether an alert received from an uncertified application is allowed to be sent to a certified application;
   in response to determining that the received alert received from the uncertified application is not allowed to be sent to the certified application, discard the received alert;
   in response to determining that the received alert received from the uncertified application is allowed to be sent to the certified application, send the received alert to be ratified.

16. The system of claim 15, the processor further executes the instructions to:
   determine a priority of the alert received from the alert collection module;
   determine whether there are multiple received alerts with a same priority and same type;
   if there are multiple received alerts with the same priority and same type, select an alert to be notified out of the multiple received alerts, and configure the selected alert to be notified;
   if there are not multiple received alerts with the same priority and same type, configure the received alert to be notified; and
   send the configured alert to the alert notification and feedback module.

17. The system of claim 11, wherein the processor further executes the instructions to:
   collect onboard sensor data and platform electronics systems data; and
   determine a current platform state and operator workload based on the collected sensor data and platform electronics systems data.

18. The system of claim 11, wherein the processor further executes the instructions to:
   in response to determining the ratified alert is not to be postponed, discard the ratified alert;
   in response to determining the ratified alert is to be notified immediately, perform the second process for the ratified alert.

19. The system of claim 11, wherein:
   the processor is apart of a system that hosts an avionics certified application onboard an aircraft; or
   the processor is apart of the system that hosts an uncertified application on an electronic flight bag (EFB) device.

20. The system of claim 11, wherein:
   the selected notification device comprises an electronic flight instrument system (EFIS) display, a primary flight display (PFD), a multi-function display (MFD), a control display unit (CDU), a multi-function control and display unit (MCDU), a head-up display (HUD), a wearable display, an aural alert device, or a vibrational alert device; and
   the alert notification comprises symbols having one or more colors or sizes, scratch pad messages, one or more aural tones, one or more physical vibrations, or combinations thereof.

* * * * *